United States Patent

[11] 3,607,089

[72] Inventor Paul Richard Stoesser
        Midland, Mich.
[21] Appl. No. 862,435
[22] Filed Sept. 30, 1969
[45] Patented Sept. 21, 1971
[73] Assignee The Dow Chemical Company
        Midland, Mich.

[54] MINIATURE REACTION VESSEL
    6 Claims, 2 Drawing Figs.
[52] U.S. Cl. .................................................. 23/253 R,
                                                    23/259
[51] Int. Cl. ........................................ G01n 25/20,
                                                    G01n 31/20
[50] Field of Search .................................. 23/259,
                        253, 230 US, 254 US, 292; 73/190

[56] References Cited
UNITED STATES PATENTS
1,207,860 12/1916 Carvalho et al. ............... 23/259
2,791,492 5/1957 Isbell ........................... 23/259
3,446,596 5/1969 Salivar et al. ................. 23/253 X Primary Examiner—Joseph Scovronek
Attorneys—Griswold & Burdick, Richard G. Waterman and Robert B. Ingraham ABSTRACT: A miniature reaction vessel is described which is particularly suitable for use in a microcalorimeter wherein reactions may be carried out with minimal vapor space in the vessel. One of the reactants is contained in a frangible vessel which is broken by a gravity-operated trigger mechanism.

PATENTED SEP 21 1971 3,607,089

INVENTOR.
Paul Richard Stoesser
BY
Robert H. Bachman
AGENT

MINIATURE REACTION VESSEL

Chemical and physical reactions by means of microcalorimetric techniques has become of increasing interest. Such apparatus is well known and often employs miniaturized reaction vessels for various and specific purposes wherein two or more components are maintained apart within the vessel until the contents have reached the desired temperature. The reactants or components are mixed and the flow of heat to or from the vessel is measured. Vessels of this nature are described in U.S. Pat. Nos. 3,193,357; 3,211,531 and 3,245,758 as well as by S. R. Gunn in "Review of Scientific Instruments," 29, pg. 377 (1958) herewith incorporated by reference. Oftentimes it is desirable to perform calorimetric measurements wherein the reaction vessel has minimal vapor space and positive separation of the components is desired. Agitation is also frequently desirable, particularly when the interaction between a solid and a liquid is being studied. In general, in order to obtain a reasonably reproducible and accurate result, it is necessary that thermal effects due to vapor space and mechanical considerations be minimized. As the miniaturized reaction vessel is not readily accessible when positioned in a calorimeter, it is desirable that the reactants be contacted by a procedure such as dipping, tilting or turning at least the insulated shell of the calorimeter and permitting gravity to actuate some manner or means of bringing the liquids into contact.

It would be desirable if there were available an improved miniature reaction vessel particularly suited for use where minimal vapor space is desired.

It would also be desirable if there were available an improved miniaturized reaction vessel with a gravity-operated means for causing the components to become mixed.

It would also be desirable if there were available an improved gravity-operated miniaturized reaction vessel which supplied a uniform reproducible amount of heat when rupturing the separating means.

It would also be beneficial if such a vessel permitted relatively uniform agitation of the contents.

These benefits and other advantages in accordance with the present invention are achieved in a miniature reaction vessel, the miniature reaction vessel comprising a housing, the housing having a first end and a second end, a sample support means disposed adjacent the first end, the sample support means adapted to support a frangible vessel within the housing, the housing having a first closeable passage means disposed thereon and sealable externally of the housing, a frangible vessel-rupturing means disposed within the housing adjacent the second end thereof, the rupturing means comprising a support means having slidably disposed therein a vessel-rupturing member resiliently tensioned toward the frangible vessel support and adapted to engage and rupture the vessel, a trigger means adapted to engage the vessel-rupturing means at a location generally adjacent the second end of the vessel, the trigger means comprising a lever having a first end and a second end, the lever being pivotally affixed adjacent the second end and adapted to engage the rupturing means when the rupturing means is positioned adjacent the second end of the housing, the second end of the lever being resiliently tensioned by a tensioning means, the tensioning means being of a strength insufficient to prevent movement of the lever under the influence of the force of gravity when the rupturing means is disposed adjacent the second end of the housing, the tensioning means adapted to be engaged by the rupturing means when the rupturing means is disposed adjacent the first end of the body and prevent movement of the lever under the influence of gravity.

Further features and advantages of the present invention will become more apparent from the following specification taken in connection with the drawing wherein.

Figure 1:
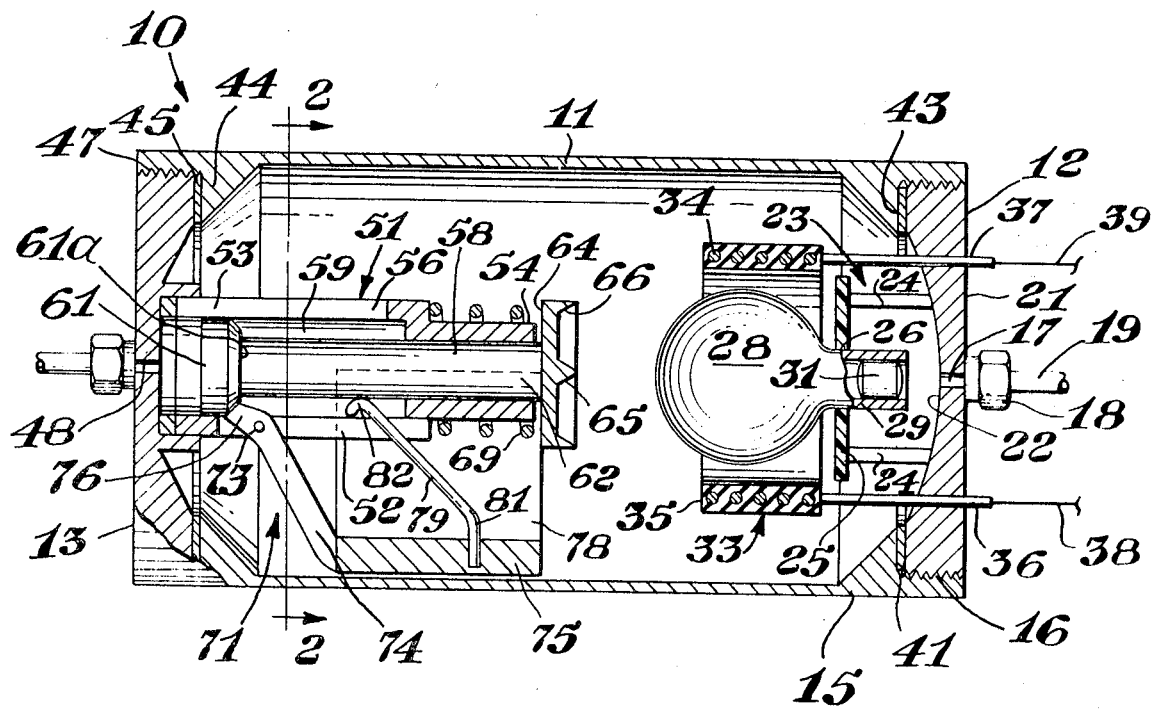
FIG. 1 is a partially in section view of a vessel in accordance with the invention.
Figure 2:
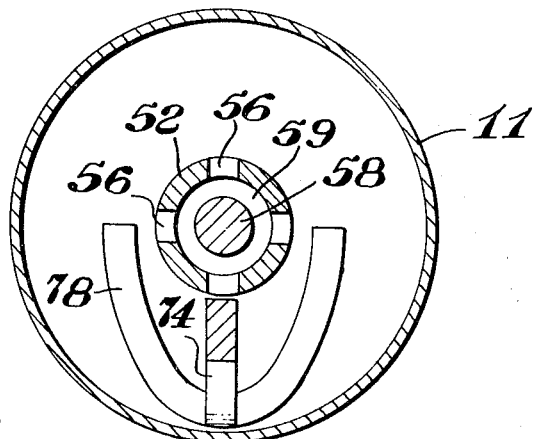
FIG. 2 is a sectional view of FIG. 1 taken along the line 2—2 of FIG. 1.

In FIGS. 1 and 2 there is depicted a miniature reaction vessel in accordance with the present invention generally designated by the reference numeral 10. The vessel 10 comprises a housing 11, the housing 11 being of material which is nonreactive or inert to the reaction components. Beneficially, the housing can be made of materials such as stainless steel, titanium, polytetrafluoroethylene and the like. Generally, it is advantageous, where conditions permit, to employ a metallic housing to provide as high a heat conductivity as possible. The housing 11 has a first end 12 and a second end 13, the first end 12 advantageously being threadably affixed to a cylindrical shell 15 be means of threads 16. The first end 12 defines a closeable passage 17 generally centrally disposed therein. The closeable passage 17 advantageously is defined by a tubing fitting 18 having a tubing portion 19 secured therein, the tubing portion 19 being of a malleable material such as stainless steel which can be closed by crimping or pinching. The first end 12 has an exterior face 21 and an interior face 22. On the interior face 22 is disposed a sample support means 23. The sample support means 23 comprises a plurality of support legs 24 extending axially inwardly to a shell 15 and supporting a vessel-engaging means 25 in spaced relationship to the inner face 22 of the first end 12. The vessel-engaging means 25 beneficially is of a synthetic resinous material such as polytetrafluoroethylene and defines a generally centrally disposed opening 26 adapted to frictionally engage the retain a frangible vessel 28. Alternately, a three or four jaw stainless steel collet is eminently satisfactory. Beneficially, the frangible vessel 28 is a glass bulb having a neck portion 29 and being sealed with a plug 31. The vessel 28 is supported in such a manner that the neck 29 is disposed generally adjacent the inner face 22 of the first end 12. A heater assembly 33 is supported by the first end 12 within the housing 11. The heater assembly 33 comprises a generally helically wound resistance element 34 encapsulated within electrical insulation 35. The insulation 35 in turn is supported by a first hollow support leg 36 and a second hollow support leg 37. The legs 36 and 37 beneficially are of stainless steel tubing and extend entirely through the first end 12. Disposed within the support legs 36 and 37 and electrically insulated therefrom are heater leads or conductors 38 and 39 which are in electrical communication with opposite ends of the helical resistance element 34. The heating assembly 33 permits the addition of heat to the reaction vessel by supplying a predetermined amount of electrical power thereto. The first end 12 is in sealing engagement with a generally peripherally disposed gasket 41. The gasket 41 in turn is in sealing engagement with an internal shoulder or flange 43 of the shell 15. Beneficially, the end 12 and the shell 15 are in liquidtight mating engagement. A generally similar inwardly projecting shoulder 44 is disposed at the second end 13 of the housing 11 which is in sealing engagement with a gasket 45. The gasket 45 in turn is in sealing engagement with the second end 13. The second end 13 threadably engages the shell 15 by means of threads 47. A sealable passage 48 is generally centrally disposed within the second end 13 and provides communication between space within the shell 15 and space external to the housing 11. Beneficially, the passage 48 is defined by fitting and tubing in a manner similar to the passage 17. A frangible vessel-rupturing means 51 is disposed within the housing 11 generally adjacent the second end 13, the rupturing means comprising a support means 52 having a generally hollow cylindrical configuration. The support means 52 has a first end 53 and a second end 54, the second end 54 of the support means 52 being of a lesser diameter than the first end 53. The support means 52 defines a plurality of generally axially extending slots 56 generally coextensive with a first cylindrical space 59 defined within the first end 53. The first end 53 of the support means 52 is affixed to the second end 13 of the housing 11 and projects into the housing 11. A vessel-rupturing member 58 is disposed within the support means and is slidably disposed therein. The vessel-rupturing member 58 has a first end 61 disposed within the cylindrical space 59 and is dimensioned to be slidably supported therein.

A major portion or body 62 of the rupturing member 58 is slidably supported within the second end 54 of the support means 52. A generally discoidal second end 64 of the rupturing member 58 is disposed external to the rupturing means 51 and adjacent the first end 12 of the housing 11. The second end 64 defines a generally centrally disposed vessel-engaging point 65 and a peripherally disposed vessel-engaging flange 66. A resilient tensioning means or spring 69 is disposed about the second end 54 of the support 52 and engages the second end 54 of the vessel-rupturing member 58 and resiliently tensions the rupturing member 58 toward the first end 12 of the housing 11. A trigger means 71 is pivotally supported by the support means 52 by a pivot 73. The pivot 73 supports a lever 74 having a first end 75 and a second end 76, the second end 76 being in engagement with a shoulder 61a on the first end 61 of the vessel-rupturing member 58. As depicted in FIG. 1, the second end 76 of the lever 74 prevents movement of the vessel-rupturing member 58 toward the first end of the housing 11. Adjacent the second end 76 of the lever 74 is rigidly affixed a trigger-actuating mass 78. A lever-tensioning means or spring 79 having a first end 81 and a second end 82 is affixed to the first end 75 of the lever 74 remote from the pivot 73. The second end of the spring 79 passes within a slot 56 of the support means 52 and engages the body portion 62 of the vessel-rupturing member 58.

In operation of the reaction vessel as depicted in FIGS. 1 and 2, displacement of the first end 75 of the lever 74 toward the longitudinal axis of the housing 11 causes bending of the spring 79 and release of the shoulder 61a by the second end 76 of the lever 74. The vessel-rupturing member 58 is then driven by the spring 69 toward the vessel 28. The vessel-rupturing point engages the vessel 28 and ruptures the immediately adjacent portion. The flange 66 of the end 64 of the vessel-rupturing member 58 travels toward the first end 12 for a distance sufficient to engage the vessel 28 at a location equivalent to its point of maximum diameter thereby shattering about one-half of the vessel. As the vessel-rupturing member 58 moves toward the first end 12, the shoulder 61a of the first end 61 of the rupturing member 58 engages the second end 82 of the spring 79 and causes the first end 75 of the lever 74 to be forced against the adjacent interior portion of the shell 15, effectively locking it in a position where it does not move under the force of gravity. Beneficially, the mass 78 is sufficiently large that when the vessel, such as that depicted in FIG. 1, is rotated about 100° about an axis in a plane lying normal to the plane of the paper, the lever 74 is actuated to permit rupture of the vessel 28.

Beneficially, a frangible vessel such as the vessel 28 is a thin-walled glass vessel which may be stoppered as is shown in FIG. 1, or alternately, flame sealed if a small vapor space can be tolerated. If agitation is desired within the miniaturized reaction vessel, a suitable insoluble inert material may be incorporated within the frangible vessel. For example, in determining heat solution of a polymer such as polystyrene, polymethylmethacrylate or the like, solid polymer granules may be placed in the frangible vessel and the vapor space therein filled with mercury and the vessel closed or stoppered. If minimal vapor space is desired, the vessel is placed in a chamber which is evacuated to a desired pressure and the stopper inserted in the vessel while it is evacuated. This is readily accomplished by supporting the stopper on the end of a threadably mounted vacuum-sealed rod, while the vessel is under vacuum the stopper forced therein by advancing the rod. The frangible vessel is then frictionally mounted within the vessel support means 23. The rupturing means 51 is then cocked by forcing the rupturing member 58 toward the second end of the housing until the shoulder 61a engages the second end 76 of the lever 74 with the first end 75 disposed in the generally downward direction such as depicted in FIG. 1. The first end 12 in threaded into the shell 15 and tightened to provide the desired seal against the gasket 41. Desired liquid is then optionally introduced through the passage 48 with the vessel in the near vertical position but with the first end 75 of the lever 74 still downwardly disposed so that the rupturing member 58 is not released. When liquid flows from the passage 19, both passages are closed, and in the embodiment depicted in FIG. 1, this is readily accomplished by pinching the tubing, folding it over on itself and crimping with a pair of pliers. Alternately, miniature valves may be employed or only a single passage such as the passage 19 utilized and the vessel filled by means of a hypodermic syringe and needle wherein the needle is introduced into the passage 19 and sufficient liquid to fill the vessel provided through the hypodermic needle. The reaction vessel 10 is then ready to be placed in the calorimeter, electrical connections made to leads 38 and 39. When the desired temperature has been attained, rotation of the calorimeter chamber causes rupture of the vessel with the generation of a predetermined and reproducible amount of heat. A reaction vessel generally similar to that depicted in FIG. 1 on rupture of the vessel generates about 10 millicalories and has proved eminently satisfactory for the determination of heat solution of solids and liquids wherein minimal vapor space is required.

As is apparent from the foregoing specification, the present invention is susceptible of being embodied with various alterations and modifications which may differ particularly from those that have been described in the preceding specification and description.

What is claimed is:

1. A miniature reaction vessel, the miniature reaction vessel comprising
    a housing, the housing having
    a first end and
    a second end,
    a sample support means disposed adjacent the first end, the sample support means having means to engage and support
    a frangible vessel containing a sample within the housing, the housing having
    a first closeable passage means disposed thereon and sealable externally of the housing,
    a frangible vessel-rupturing means disposed within the housing adjacent the second end thereof, the rupturing means comprising
    a support means having slidably disposed therein
    a vessel-rupturing member including means to resiliently tension the rupturing member toward the sample support means and adapted to engage and rupture the vessel,
    a trigger means adapted to engage the vessel-rupturing means at a location generally adjacent the second end of the vessel, the trigger means comprising
    a lever having
    a first end and
    a second end, the lever being pivotally affixed adjacent the second and adapted to engage the rupturing means when the rupturing means is positioned adjacent the second end of the housing, the second end of he lever being resiliently tensioned by
    a tensioning means, the tensioning means being of a strength insufficient to prevent movement of the lever under the influence of the force of gravity when the rupturing means is disposed adjacent the second end of the housing, the tensioning means being adapted to be engaged by the rupturing means when the rupturing means is disposed adjacent the first end of the body and prevent movement of the lever under the influence of gravity.

2. The vessel of claim 1 wherein the housing has a generally cylindrical configuration.

3. The vessel of claim 2 wherein the vessel support and the rupturing means are generally axially positioned.

4. The vessel of claim 1 wherein the frangible vessel support means frictionally engages the frangible vessel.

5. The apparatus of claim 1 including an electrical heater assembly disposed within the housing.

6. The vessel of claim 1 having a sealable passage means disposed adjacent the second end of the vessel.